US009510577B2

(12) United States Patent
Hyun

(10) Patent No.: US 9,510,577 B2
(45) Date of Patent: Dec. 6, 2016

(54) FISHING REEL HAVING HYBRID CLUTCH

(71) Applicant: DOYO ENGINEERING CO., LTD, Bucheon (KR)

(72) Inventor: Kang-Ho Hyun, Bucheon (KR)

(73) Assignee: DOYO ENGINEERING CO., LTD. (KR)

( * ) Notice: Subject to any disclaimer, the term of this patent is extended or adjusted under 35 U.S.C. 154(b) by 0 days.

(21) Appl. No.: 14/565,683

(22) Filed: Dec. 10, 2014

(65) Prior Publication Data

US 2015/0164057 A1    Jun. 18, 2015

(30) Foreign Application Priority Data

Dec. 17, 2013  (KR) .......................... 10-2013-0157123

(51) Int. Cl.
*A01K 89/01*        (2006.01)
(52) U.S. Cl.
CPC ..... *A01K 89/01901* (2015.05); *A01K 89/0189* (2015.05)
(58) Field of Classification Search
CPC .............. A01K 89/015; A01K 89/0188; A01K 89/0189; A01K 89/01901; A01K 89/0191
See application file for complete search history.

(56) References Cited

U.S. PATENT DOCUMENTS

| | | | | | |
|---|---|---|---|---|---|
| 5,358,197 | A | * | 10/1994 | Sakaguchi | ........... A01K 89/015 242/261 |
| 5,775,614 | A | * | 7/1998 | Yamaguchi | .......... A01K 89/015 242/261 |
| 6,315,228 | B1 | * | 11/2001 | Sato | ...................... A01K 89/015 242/261 |
| 2004/0075005 | A1 | * | 4/2004 | Myojo | ................. A01K 89/015 242/310 |
| 2007/0181728 | A1 | * | 8/2007 | Kawasaki | .............. A01K 89/00 242/310 |
| 2010/0327098 | A1 | * | 12/2010 | Hyun | ................... A01K 89/015 242/301 |
| 2013/0193250 | A1 | * | 8/2013 | Ikebukuro | ............ A01K 89/015 242/261 |

FOREIGN PATENT DOCUMENTS

KR              200191968         5/2000

* cited by examiner

*Primary Examiner* — Emmanuel M Marcelo
(74) *Attorney, Agent, or Firm* — Cantor Colburn LLP

(57) ABSTRACT

Disclosed herein is a fishing reel having a hybrid clutch. The clutch controls rotation of a spool such that when casting a fishing line, the rotation of the spool is not restricted, and only when a handle is rotated to reel in the fishing line is the rotation of the spool restricted so that the spool can be rotated only in the direction in which the fishing line is reeled in. For this, the fishing reel includes: an integrated clutch unit including a clutch link coupled to the clutch bar, and a clutch cam connected to the clutch link and rotated around a shaft of the spool; and a ratchet pawl coupled to the clutch cam by a hinge and selectively coming into contact with a ratchet provided on a rotating shaft of the handle depending on rotation of the clutch cam, thus controlling the rotation of the spool.

2 Claims, 21 Drawing Sheets

[ B ]

[40; 400'~440]

FISHING REEL HAVING HYBRID CLUTCH

BACKGROUND OF THE INVENTION

1. Field of the Invention

The present invention generally relates to fishing reels having hybrid clutches. More particularly, the invention relates to a fishing reel having a hybrid clutch controlling rotation of a spool such that when casting a fishing line, the rotation of the spool is not restricted, and only when a handle is rotated to reel in the fishing line is the rotation of the spool restricted so that the spool can be rotated only in the direction in which the fishing line is reeled in. For this, the fishing reel includes: an integrated clutch unit including a clutch link coupled to the clutch bar, and a clutch cam connected to the clutch link and rotated around a shaft of the spool; and a ratchet pawl coupled to the clutch cam by a hinge and selectively coming into contact with a ratchet provided on a rotating shaft of the handle depending on rotation of the clutch cam, thus controlling the rotation of the spool.

2. Description of the Related Art

Generally, bait reels used in lure fishing include a reel frame, a spool and a handle. The spool is rotatably mounted to the reel frame. A fishing line is wound around the spool. The handle is provided on one side of the reel frame and is interlocked with the spool so that the spool can be rotated by the handle.

A clutch is provided in the frame. The clutch makes the spool be easily rotated when casting so that the fishing line can be unwound from the spool. When a user rotates the handle to wind the fishing line around the spool, the clutch controls the rotation of the spool so that the spool can be rotated only in the direction in which the fishing line is wound around the spool.

A representative technique pertaining to the conventional fishing reel provided with the clutch was proposed in Korean Utility Model Registration No. 0191968 (date: May 31, 2000) which was filed by Banax Co., LTD. and entitled "Clutch mounting device for bait cast reel" (hereinafter, referred to as "a conventional technique").

The conventional technique includes: a ratchet fastened to a rotating shaft of a handle; a clutch cam that conducts clutch-ON or -OFF operation depending on the operation of pressing a thumb bar; and a ratchet pawl that integrally extends from the clutch cam and is locked to one of ratchet depressions formed in a circumferential surface of the ratchet by the operation of the clutch cam.

In the conventional technique, when a user pushes the thumb bar and converts the clutch into the clutch-OFF state so as to cast the fishing line, the ratchet pawl is moved in conjunction with the thumb bar and is locked to the corresponding one of the ratchet depressions formed on the circumferential surface of the ratchet. Thereafter, when the user rotates the handle to convert the clutch into the clutch-ON state, the ratchet fastened to the rotating shaft of the handle pushes the ratchet pawl. At this time, a comparatively large load is applied to the surface of the ratchet pawl that comes into contact with the ratchet.

Typically, the ratchet is made of stainless steel and is formed by a pressing process, but the ratchet pawl is formed by molding zinc due to the complexity of the shape thereof. Because the strength of zinc is lower than that of stainless steel, the contact surface of the ratchet pawl may be easily damaged by pressure applied to the contact surface when the ratchet pushes the ratchet pawl.

SUMMARY OF THE INVENTION

Accordingly, the present invention has been made keeping in mind the above problems occurring in the prior art, and an object of the present invention is to provide a fishing reel having a hybrid clutch that includes: an integrated clutch unit having a clutch cam fitted over a spool, and a clutch link rotating the clutch cam when a clutch bar is pressed; and a ratchet pawl selectively coming into contact with the ratchet depending on the clutch cam and thus controlling the rotation of the spool. Thanks to the above construction, pressure concentrated on the ratchet and the ratchet pawl can be dispersed while the clutch is operated, and minimized pressure is applied to elements when the ratchet pawl is pushed upward by the rotation of the ratchet, whereby the elements can be prevented from malfunctioning or being broken.

Another object of the present invention is to provide a fishing reel a hybrid clutch that includes: a clutch cam; and a separable clutch unit provided with a clutch link having a rotating part coupled to the clutch cam and rotating along with the clutch cam, and a pressing part coupled to a clutch bar so as to rotate the rotating part. Thanks to the above construction, the hybrid clutch can be easily manufactured. Synthetic resin such as plastic acetal can be used as the material of the clutch so that the entire weight of the fishing reel can be reduced. The stiffness of the clutch can be enhanced so as to prevent the clutch from being broken.

A further object of the present invention is to provide a fishing reel a hybrid clutch that further includes a reinforcing member which reinforces the stiffness of the integrated clutch unit or the separable clutch unit, thus preventing the fishing reel from being broken by pressure applied thereto when a user manipulates the fishing reel.

In order to accomplish the above object, the present invention provides a fishing reel having a clutch, including: a frame; a spool rotatably installed in the frame by a shaft, with a fishing line wound around an outer circumferential surface of the spool; a handle having a rotating shaft, the handle being rotated in conjunction with the shaft of the spool; and a clutch selectively coming into contact with a ratchet provided on the rotating shaft of the handle and controlling rotation of the spool. The clutch includes: an integrated clutch unit having a clutch cam supported on a surface of the frame and fitted over the shaft to be rotated, and a clutch link connected to the clutch cam and coupled to a clutch bar disposed outside the frame so that when the clutch bar is pressed the clutch link rotates the clutch cam; and a ratchet pawl coupled to the clutch cam by a hinge, the ratchet pawl selectively coming into contact with the ratchet depending on rotation of the clutch cam and controlling the rotation of the spool.

The integrated clutch unit may further have a reinforcing member coupled to a junction between the clutch cam and the clutch link or a junction between the clutch link and the clutch bar.

The clutch may include: a clutch cam supported on a surface of the frame and fitted over the shaft to be rotated; and a separable clutch unit comprising a clutch link. The clutch link may include: a rotating part coupled to the clutch cam, the rotating part rotating along with the clutch cam around the shaft; and a pressing part connected to the rotating part and coupled to a clutch bar disposed outside the frame so that when the clutch bar is pressed the pressing part rotates the rotating part.

The separable clutch unit may further include a reinforcing member coupled to a junction between the rotating part and the pressing part or a junction between the pressing part and the clutch bar.

A fishing reel having a hybrid clutch according to the present invention includes a clutch cam fitted over a shaft of a spool, and an integrated clutch unit or a separable clutch unit having a clutch link rotating along with the clutch cam. The clutch cam and the clutch link are made of the same material, preferably, synthetic resin such as plastic acetal. Thus, manufacture of the clutch can be facilitated.

Furthermore, reinforcing stiffeners and ribs can be easily manufactured and used as guides for the frame of the fishing reel. Thereby, elements including the clutch can be prevented from malfunctioning or being broken by pressure concentrated thereon. Because stainless steel is not used as material for the clutch, the weight of the fishing reel can be reduced.

In addition, the fishing reel according to the present invention introduces not only the integrated clutch unit but also the separable clutch unit. Thus, a manufacturer can provide different kinds of fishing reels to meet requirements of users. Moreover, despite using light material, the fishing reel with the separable clutch unit can be designed such that it can effectively resist force applied thereto.

Furthermore, the fishing reel having the hybrid clutch according to the present invention includes a reinforcing member to reinforce the stiffness of the integrated clutch unit or the separable clutch unit. Thereby, the fishing reel can be prevented from being damaged even after used for a long period of time, and it is easy to form an additional element such as a stiffener, a reinforcing rib, etc. on the integrated clutch unit or the separable clutch unit. Moreover, the present invention can meet the recent trend aiming toward small fishing reels that are lighter, shorter in length and use thinner materials.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
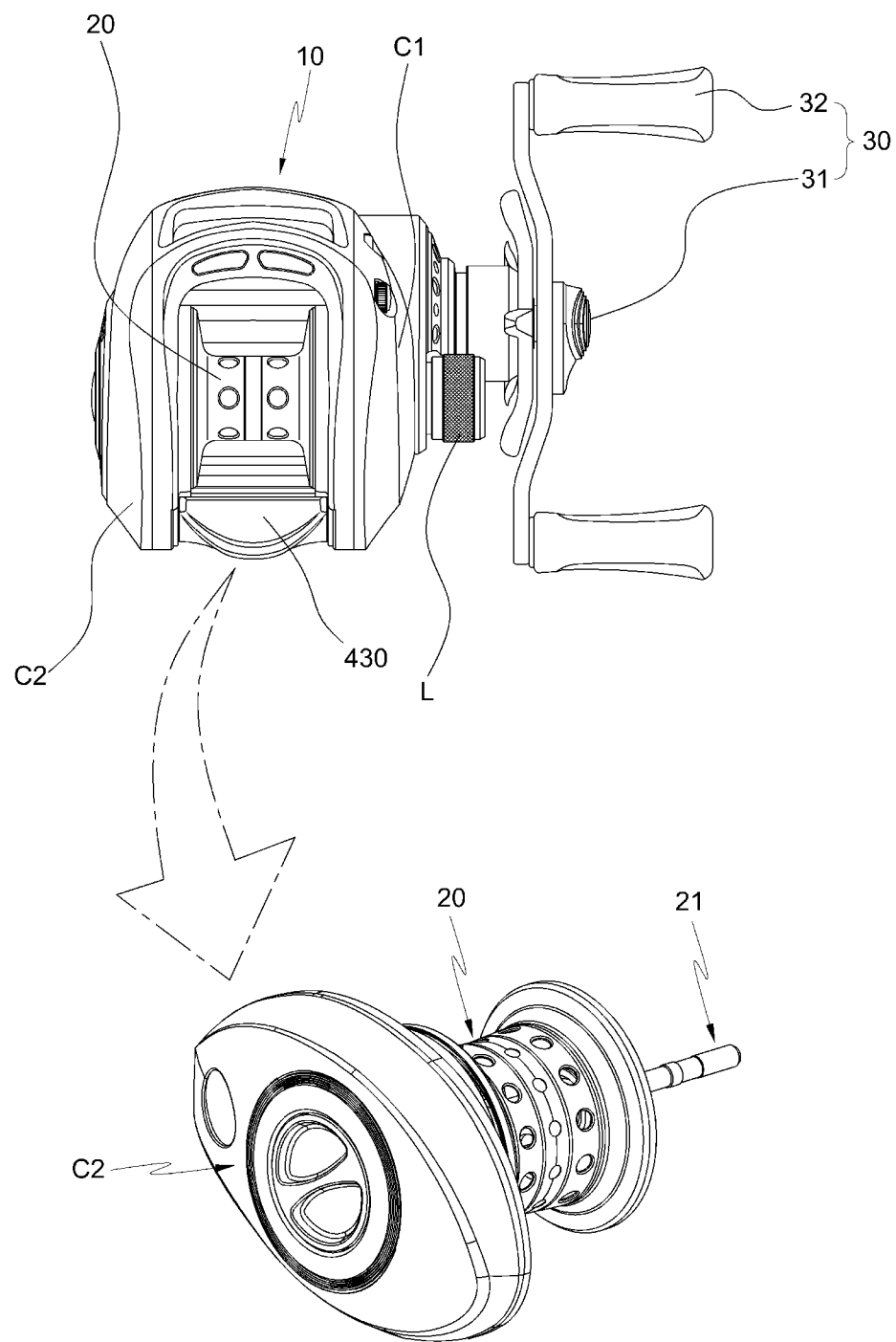
FIG. 1 is a perspective view illustrating the external shape of a fishing reel according to the present invention.

The present invention will now be described in detail based on aspects (or embodiments). The present invention may, however, be embodied in many different forms and should not be construed as being limited to only the embodiments set forth herein, but should be construed as covering modifications, equivalents or alternatives falling within ideas and technical scopes of the present invention.

In the figures, like reference numerals, particularly, tens and units, or reference numerals having like tens, units and letters refer to like elements having like functions throughout, and unless the context clearly indicates otherwise, elements referred to by reference numerals of the drawings should be understood based on this standard.

Also, for convenience of understanding the elements, in the figures, sizes or thicknesses may be exaggerated to be large (or thick), may be expressed to be small (or thin) or may be simplified for clarity of illustration, but due to this, the protective scope of the present invention should not be interpreted narrowly.

The terminology used herein is for the purpose of describing particular aspects (or embodiments) only and is not intended to be limiting of the present invention. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the present invention belongs. It will be further understood that terms used herein should be interpreted as having a meaning that is consistent with their meaning in the context of this specification and the relevant art and will not be interpreted in an idealized or overly formal sense unless expressly so defined herein.

In the description of a fishing reel having a hybrid clutch according to the present invention, the orientation will be approximately defined with reference to FIG. 1 for the sake of explanation. Left and right sides are defined based on the orientation shown in the drawing. A side at which a clutch bar 430 is provided is designated as a rear side and, based on this, front and rear sides are defined. A lower side is defined based on the direction of gravity in FIG. 2 and, based on this, upper and lower sides are defined.

Hereinafter, the fishing reel having the hybrid clutch according to the present invention will be described in detail with reference to the attached drawings.

As shown in FIGS. 1 through 14B, the fishing reel having the hybrid clutch according to an embodiment of the present invention includes: a frame 10 mounted to a fishing rod; left and right side-surface covers respectively coupled to left and right side surfaces of the frame 10; a spool 20 that is installed in the frame 10 and around which a fishing line is wound; a handle 30 that is interlocked with the spool 20 and is manipulated by a user; and a clutch 40 that is installed in the frame 10 and controls the operation of the spool 20 and the handle 30.

The frame 10 has a receiving space 13 communicating with a front opening. The spool 20 provided on a shaft (21; refer to FIG. 1) is installed in the receiving space 13. A first coupling part 11 and a second coupling part 12 are provided on the left and right side surfaces of the frame 10 so that the side-surface cover C1 and a side cover assembly C2 are respectively coupled to the first coupling part 11 and the second coupling part 12.

Front and second mounting members 14a and 14b are provided below the receiving space 13 so that the fishing reel can be mounted to the fishing rod by the first and second mounting members 14a and 14b.

A clutch bar 430 known as a thumb bar is provided in a rear opening of the frame 10. The clutch bar 430 is interlocked with the clutch 40. This will be explained in detail later herein.

The second coupling part 12 has a side opening therein so that the spool 20 is inserted into the frame 10 through the side opening. The cover assembly (C2; refer to FIG. 1) including a spool cover and a side cover is coupled to the frame 10 around the side opening.

The first coupling part 11 has therein a shaft hole 15 aligned with the center of the side opening of the second coupling part 12. A first end of the shaft 21 of the spool 20 is inserted into the shaft hole 15. The first coupling part 11 further has therein a rotating hole 16 below and ahead of the shaft hole 15. A rotating shaft 31 of the handle 30 is disposed in the rotating hole 16.

A gear (not shown) is provided on the first end of the shaft 21 so that the shaft 21 can rotate in conjunction with the handle 30.

As shown in FIG. 1, the handle 30 includes: a rotating bar coupled to the rotating shaft (31; refer to FIG. 3A); and a pair of grips 32 rotatably coupled to respective opposite ends of the rotating bar.

Furthermore, a separate locking means L interlocking with the clutch 40 is provided on the side-surface cover C1 above and behind the rotating shaft 31 of the handle 30, in detail, at a position aligned with the shaft hole in which the shaft 21 is installed. The locking means is used to releasably lock the operation of the clutch 40.

The shaft 21 of the spool 20 and the rotating shaft 31 of the handle 30 are rotated in conjunction with each other on the first coupling part 11 of the frame 10 by a plurality of gears (not shown).

Although it is not shown in the drawings, a braking means for controlling the RPM of the spool 20, for example, a speed control means using a brake shoe and a rotary plate or using a magnet, is provided on the second coupling part 12.

Figure 3A:
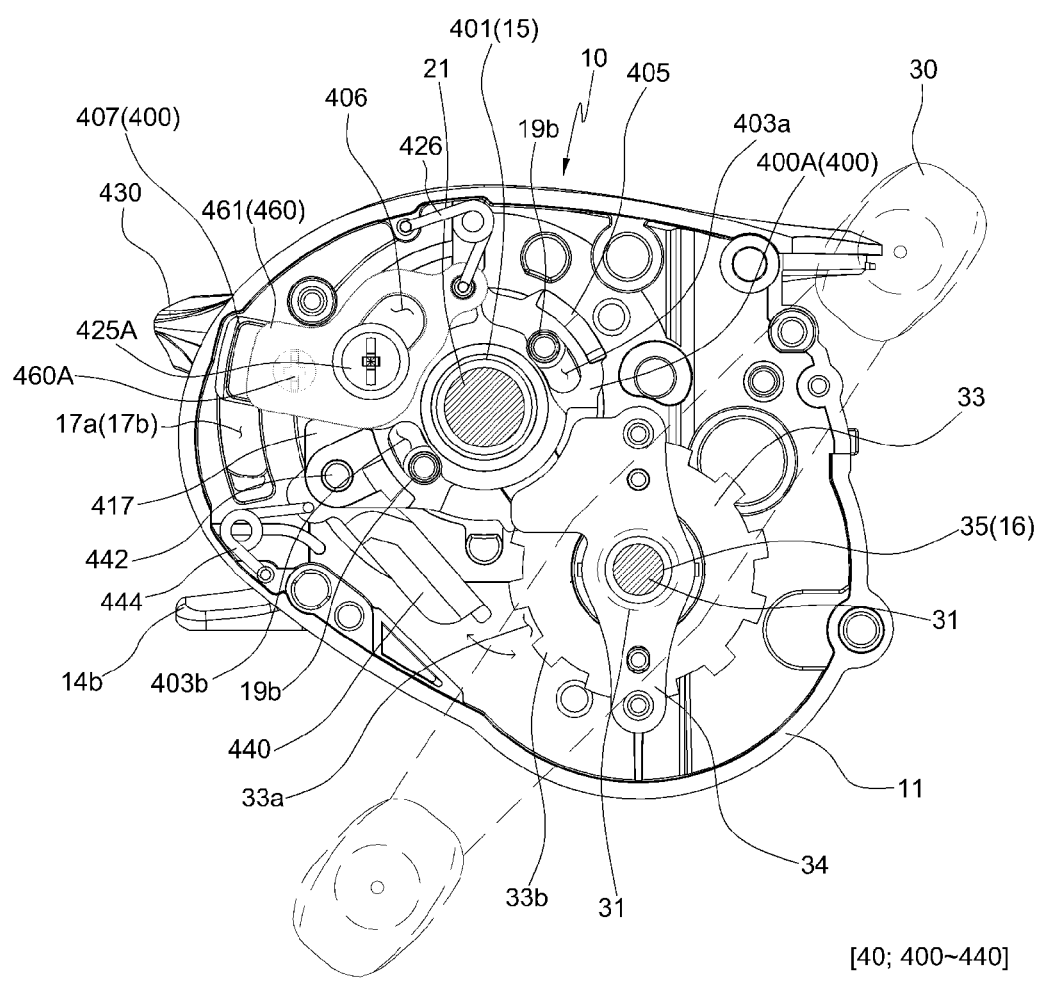
FIG. 3A is a side view showing the internal construction of the first embodiment of the fishing reel according to the present invention.
Figure 3B:
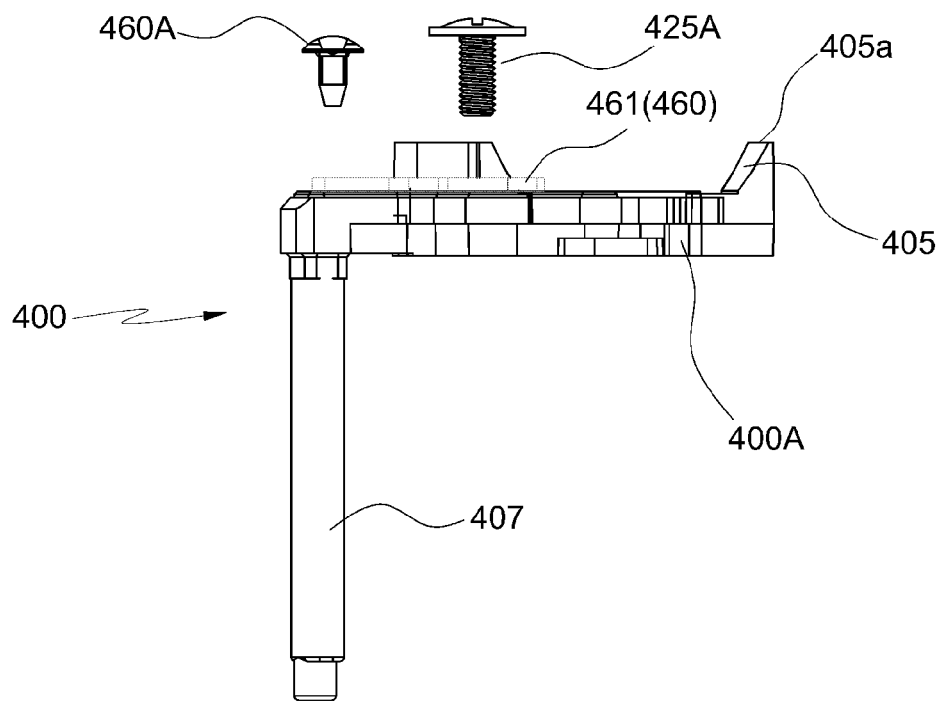
FIG. 3B is a plan view showing a reinforcing member of the first embodiment of the fishing reel according to the present invention.

As shown in FIGS. 3A and 3B, a ratchet 33 is fitted over the rotating shaft 31. The clutch 40 provided on the first coupling part 11 is selectively inserted into one of ratchet depressions 33a formed in the outer circumferential surface of the ratchet 33 so as to control the rotation of the spool (20; refer to FIG. 1).

That is, when the user casts the fishing line, the spool 20 can rotate without restriction if the clutch 40 does not make contact with the ratchet 33, in other words, if the clutch 40 is in the clutch-ON state.

Only when the clutch 40 makes contact with the ratchet 33, that is, only when the clutch is in the clutch-OFF state, can the rotation of the spool 20 be restricted so that when the user rotates the handle 30 to reel in the fishing line, the spool 20 can rotate only in one direction (in which the fishing line is reeled in).

To achieve the above-mentioned purpose, the clutch 40 has the following construction. As shown in FIGS. 2 through 7A, the clutch 40 includes a clutch cam 400A, an integrated clutch unit 400 and a ratchet pawl 440.

The clutch cam 400A is supported on an outer surface of the first coupling part 11 of the frame 10 and is fitted over the shaft 21 to be rotated along with the shaft 21.

The integrated clutch unit 400 includes a clutch link 407 that is connected to the clutch cam 400A. The clutch link 407 rotates the clutch cam 400A when the clutch bar 430 provided outside the frame 10 is pressed.

The ratchet pawl 440 is coupled to the clutch cam 400A by a hinge. The ratchet pawl 440 is selectively inserted into one of the ratchet depressions 33a of the ratchet 33 by the rotation of the clutch cam 400A so as to control the rotation of the spool 20.

The clutch cam 400A has a first through hole 401 in a central portion thereof. The gear that is coupled to the first end of the shaft 21 inserted into the shaft hole 15 of the frame 10 is disposed in the first through hole 401.

The clutch link 407 is connected to a portion of the perimeter of the clutch cam 400A. The clutch link 407 is disposed both in a first guide slot 17a formed in a rear portion of the first coupling part 11 and in a second guide slot 17b formed in a rear portion of the second coupling part 12.

A guide protrusion 408 is provided on an end of the clutch link 407 and is disposed in the second guide slot 17b. Therefore, the opposite ends of the clutch link 407 are slidably disposed in and supported by the first guide slot 17a and the second guide slot 17b.

The clutch link 407 is coupled to the clutch bar 430 that operates the clutch 40 when the user pushes the clutch bar 430 using his or her finger or the like.

For this, the clutch link 407 has a first bolt coupling hole 409a in a medial portion thereof. Protrusion coupling holes 409b are formed in the clutch link 407 at opposite sides of the first bolt coupling hole 409a.

The clutch bar 430 has therein a second bolt coupling hole 432a corresponding to the first bolt coupling hole (409a; refer to FIG. 4), and coupling protrusions 432b that are provided on opposite sides of the second bolt coupling hole 432a and are inserted into the respective protrusion coupling holes 409b.

The clutch bar 430 can be fastened to the clutch link 407 by tightening a bolt into the second bolt coupling hole 432a via the first bolt coupling hole 409a after the coupling protrusions 432b of the clutch bar 430 are inserted into the respective protrusion coupling holes.

Corresponding to the clutch link 407, mounting depressions 431 are formed in opposite sides of the clutch bar 430 so that pressure applied to the clutch bar 430 can be evenly distributed and transmitted to the entirety of the clutch link 407.

Preferably, the integrated clutch unit 400 is made of synthetic resin such as plastic acetal, etc. to reduce friction with the first coupling part 11 of the frame 10 and a yoke (450; refer to FIG. 8), which will be explained later herein, and to make the operation of the clutch unit 400 reliable and smooth.

If the integrated clutch unit 400 is made of synthetic resin, it can be easily formed by injection molding. Specially, if the injection molding method is used to form the integrated clutch unit 400, it is easy to form reinforcing stiffeners and ribs on the clutch cam 400A and the clutch link 407. Furthermore, the reinforcing stiffeners and ribs can function as a guide for the frame 10 so that pressure transmitted to the clutch unit 400 through the clutch bar 430 can be evenly distributed, whereby the durability of the clutch unit 400 can be enhanced.

As shown in FIGS. 2 through 7A, the clutch cam 400A has therein a first guide slot 406 so that the integrated clutch unit 400 can be rotatably supported by the first coupling part 11 of the frame 10.

Figure 2:
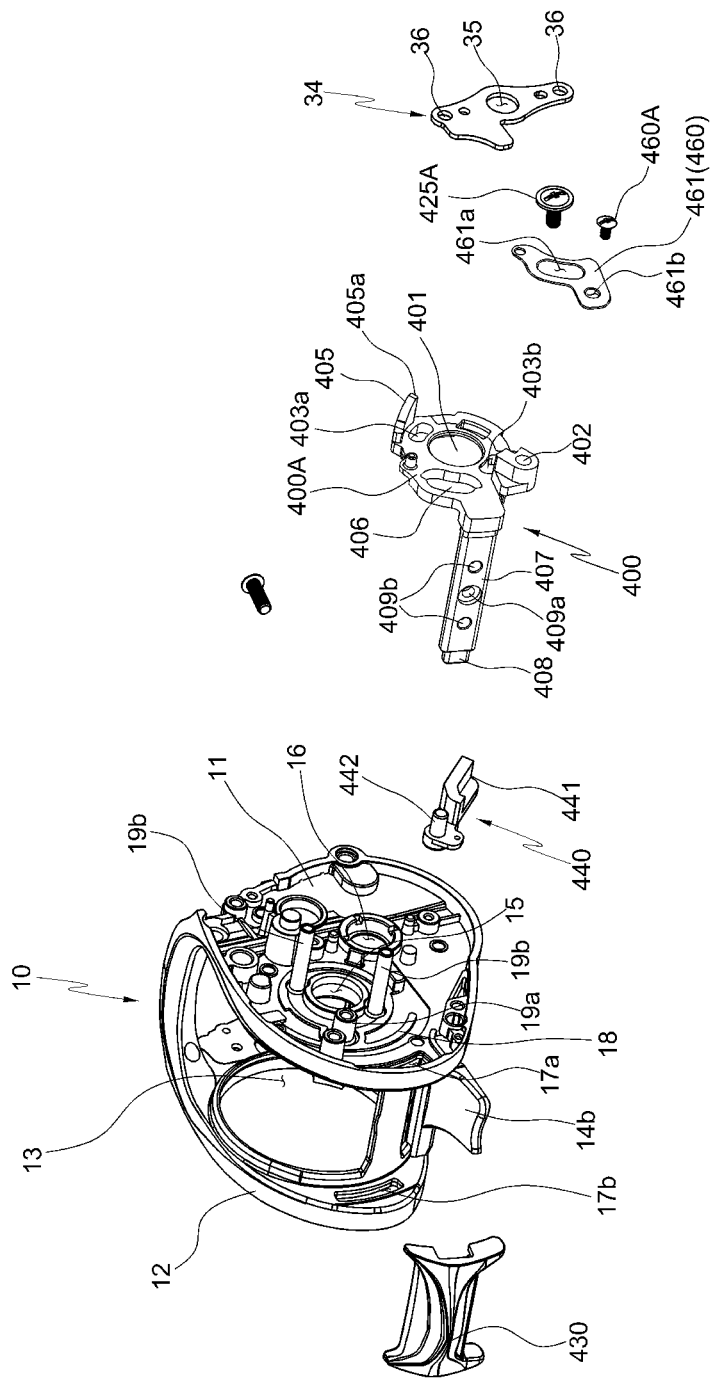
FIG. 2 is an exploded perspective view illustrating a first embodiment of the fishing reel according to the present invention.

As shown in FIG. 2, a first guide protrusion 19a is provided on the first coupling part 11 of the frame 10. After the first guide protrusion 19a has been inserted into the first guide slot 406 of the integrated clutch unit 400, a bolt 425A is threaded into the first guide protrusion 19a.

Then, when the clutch bar 430 is pushed, the integrated clutch unit 400 is guided along the first guide slot 406 by the first guide protrusion 19a and is rotated around the shaft 21.

The clutch cam 400A further has first and second guide slots 403a and 403b around the first through hole 401 so as to enhance the reliability in operation of the integrated clutch unit 400.

Second guide protrusions 19b are provided on the first coupling part 11 of the frame 10.

The second guide protrusions 19b are respectively disposed in the first and second guide slots 403a and 403b of the clutch cam 400A.

When the integrated clutch unit 400 rotates around the shaft 21, the second guide protrusions 19b function as guides to assist the rotation of the integrated clutch unit 400.

A bolt or the like is threaded into the second guide protrusion 19b to couple the side-surface cover (C1; refer to FIG. 1) to the frame 10.

To reinforce the stiffness of the integrated clutch unit 400, a reinforcing member 460 is provided on a junction between the clutch cam 400A and the clutch link 407 or a junction between the clutch link 407 and the clutch bar 430. In this way, the present invention can promote a reduction in weight of the fishing reel and an increase in stiffness of the clutch unit 400.

As shown in FIGS. 2, 3A and 3B, a first embodiment of the reinforcing member 460 includes a reinforcing plate 461 that covers an outer surface of the clutch cam 400A and is coupled to the clutch cam 400A by a bolt 460A.

The reinforcing plate 461 is a planar member covering both the junction between the clutch link 407 and the clutch cam 400A and a portion of the outer surface of the clutch cam 400A. The reinforcing plate 461 has a coupling hole 461b for bolt coupling, and an auxiliary guide slot 461a corresponding to the first guide slot 406 for use in guiding the rotation of the integrated clutch unit 400.

Figure 4:
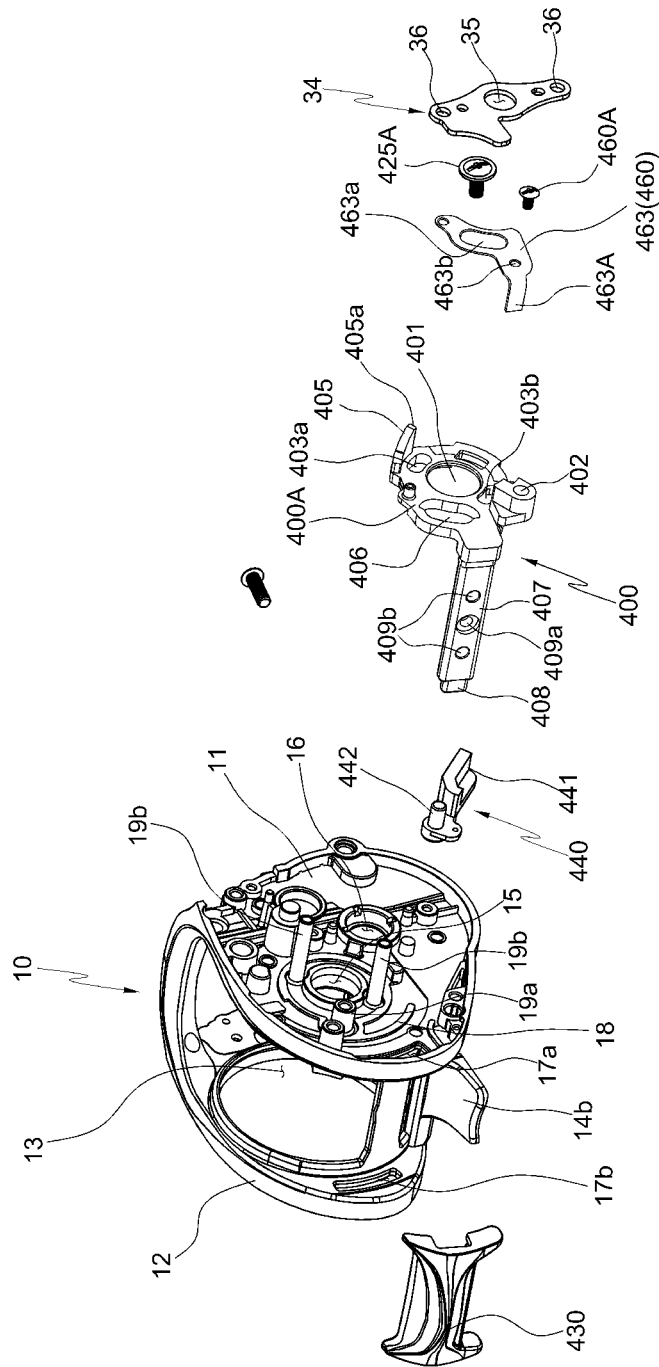
FIG. 4 is an exploded perspective view illustrating a first embodiment of the fishing reel according to the present invention.
Figure 5A:
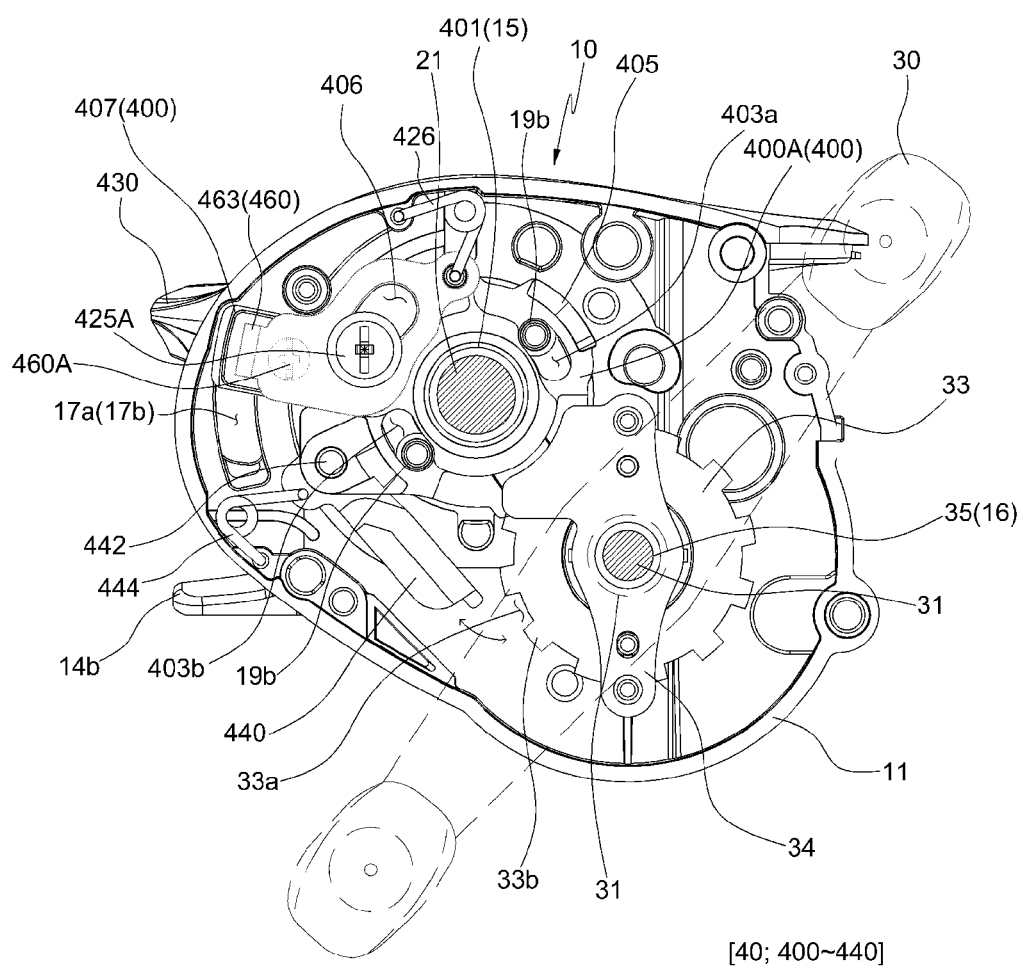
FIG. 5A is a side view showing the internal construction of the first embodiment of the fishing reel according to the present invention.
Figure 5B:
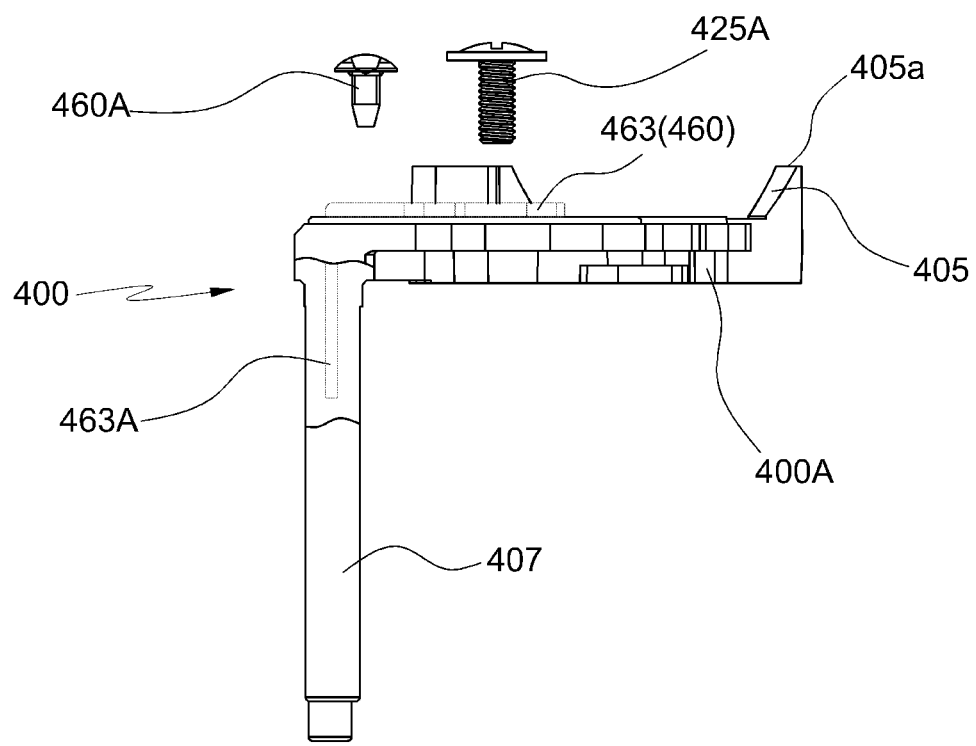
FIG. 5B is a plan view showing a reinforcing member of the first embodiment of the fishing reel according to the present invention.

As shown in FIGS. 4, 5A and 5B, a second embodiment of the reinforcing member 460 includes: a reinforcing plate 463 that covers the outer surface of the clutch cam 400A and is coupled to the clutch cam 400A by a bolt 460A; and a bent part 463A that is bent from a portion of the reinforcing plate 463 and is inserted into the clutch link 407.

The reinforcing plate 463 and the bent part 463A are integrally formed with each other. Because the bent part 463A is inserted into the clutch link 407 through the outer surface of the clutch cam 400A, the stiffness of the clutch cam 400A can be enhanced such that the clutch cam 400A can sufficiently resist pressure transmitted from the clutch bar 430.

In the drawings, reference numerals 463a and 463b respectively denote an auxiliary guide slot and a coupling hole.

Figure 6:
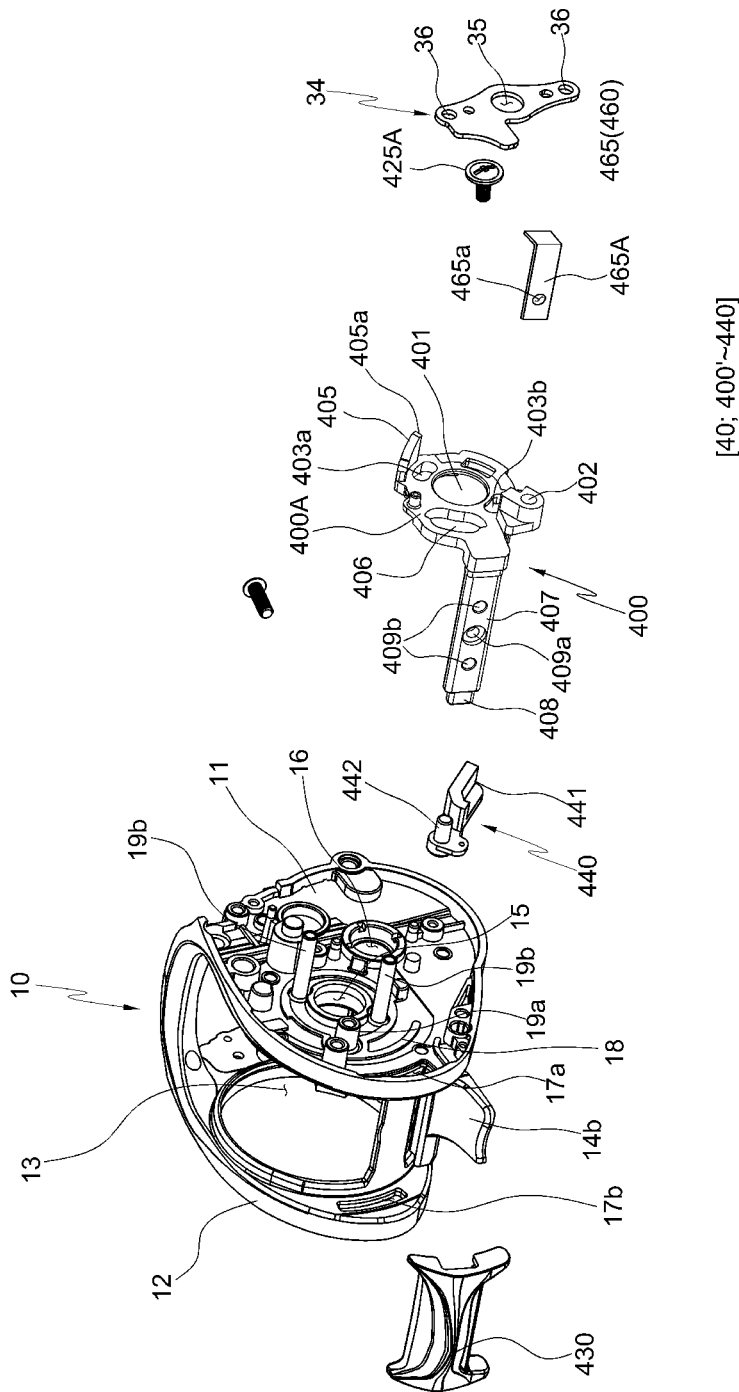
FIG. 6 is an exploded perspective view illustrating a first embodiment of the fishing reel according to the present invention.
Figure 7A:
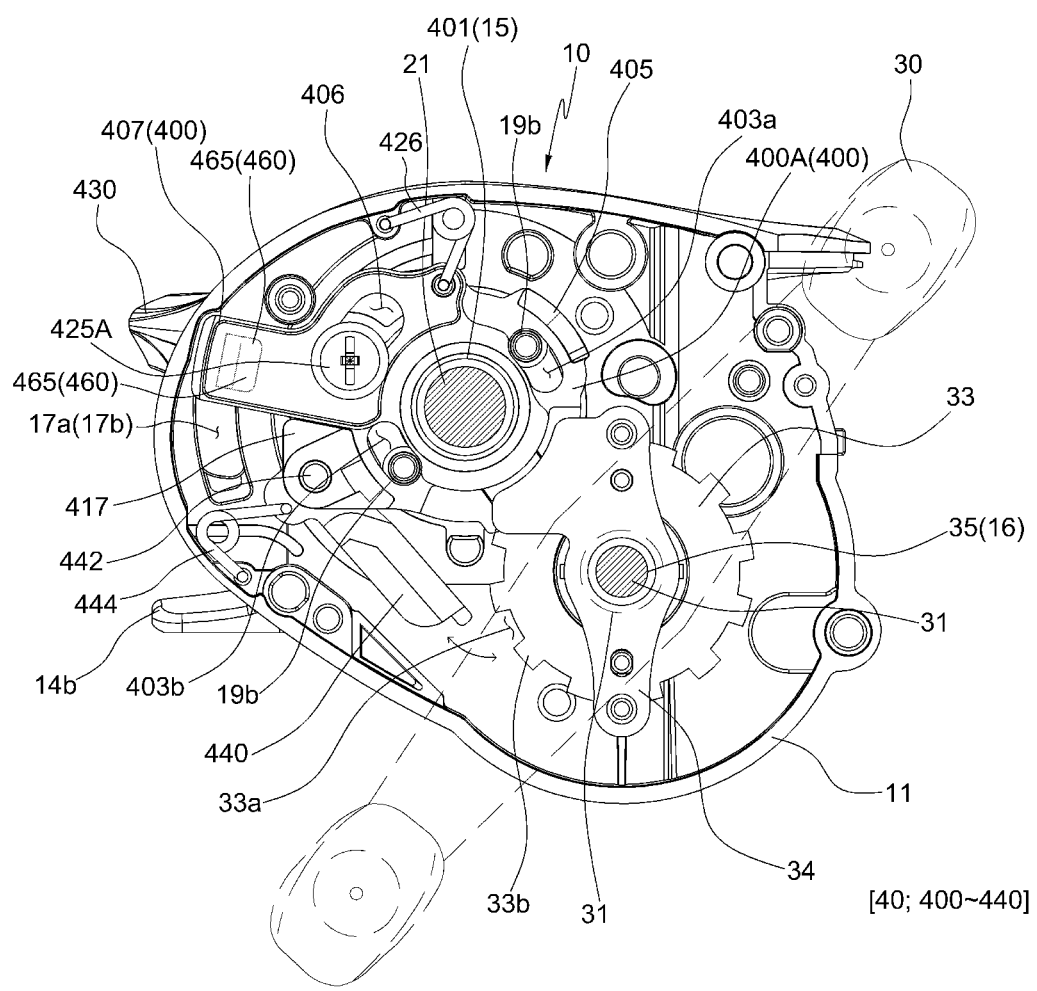
FIG. 7A is a side view showing the internal construction of the first embodiment of the fishing reel according to the present invention.
Figure 7B:
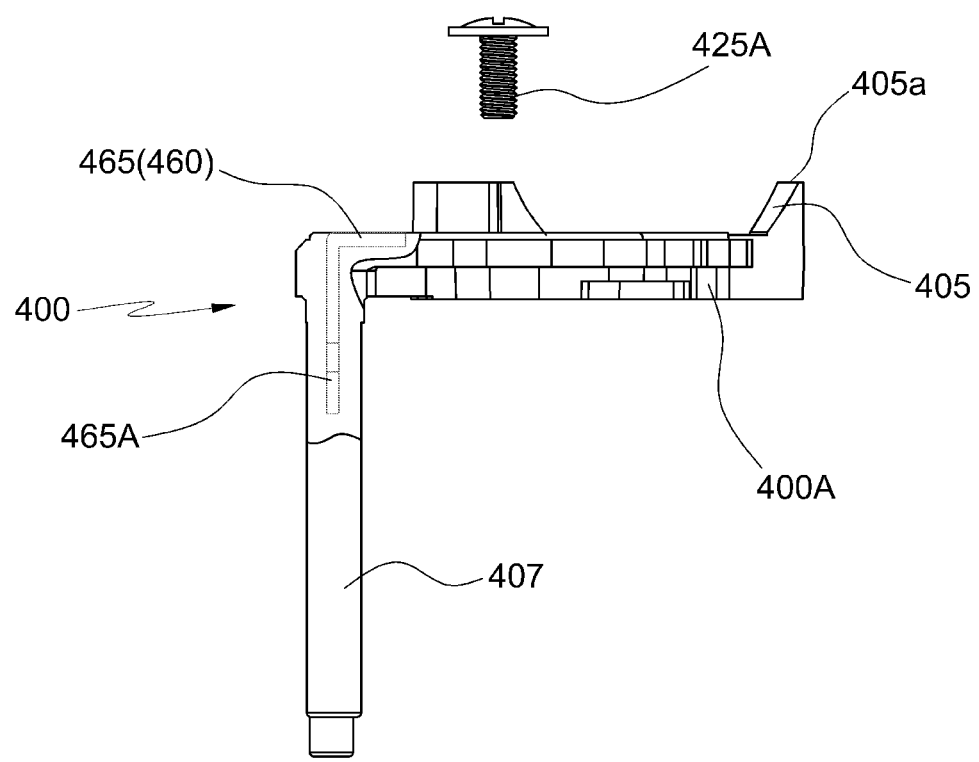
FIG. 7B is a plan view showing a reinforcing member of the first embodiment of the fishing reel according to the present invention.

As shown in FIGS. 6, 7A and 7B, a third embodiment of the reinforcing member 460 includes: an insert part 465A inserted into the clutch link 407; and a locking part 465 that is connected to the insert part 465A and installed in and locked to the clutch link 407.

The reinforcing member 460 according to the third embodiment may be manufactured by an insert injection molding method or a double injection molding method because the reinforcing member 460 is completely inserted into the integrated clutch unit 400.

Reference numeral 465a denotes a coupling hole corresponding to the protrusion coupling hole 409b formed in the medial portion of the clutch link 407.

In the drawings of this specification, although each reinforcing member 460 has been illustrated as being provided on the junction between the clutch link 407 and the clutch cam 400A of the integrated clutch unit 400, the reinforcing member 460 may be provided on the junction of the clutch link 407 and the clutch bar 430, that is, over the overall length of the clutch link 407. Those skilled in this art will be able to easily embody such a modification; therefore, further explanation is deemed unnecessary.

As stated above, in the present invention, the reinforcing member 460 is provided on a vulnerable portion of the integrated clutch unit 400 or the junction between the integrated clutch unit 400 and the clutch bar 430, whereby the stiffness of the integrated clutch unit 400 can be enhanced. In this way, the present invention can not only achieve the purpose of a reduction in weight of the fishing reel but can also enhance the durability of the fishing reel so that the fishing reel can be prevented from being damaged by repeated operations.

As shown in FIGS. 11A through 13B, the several embodiments of the reinforcing member can be applied to a separable clutch unit 400', which will be explained later herein, in the same manner as that of the above description.

Figure 8:
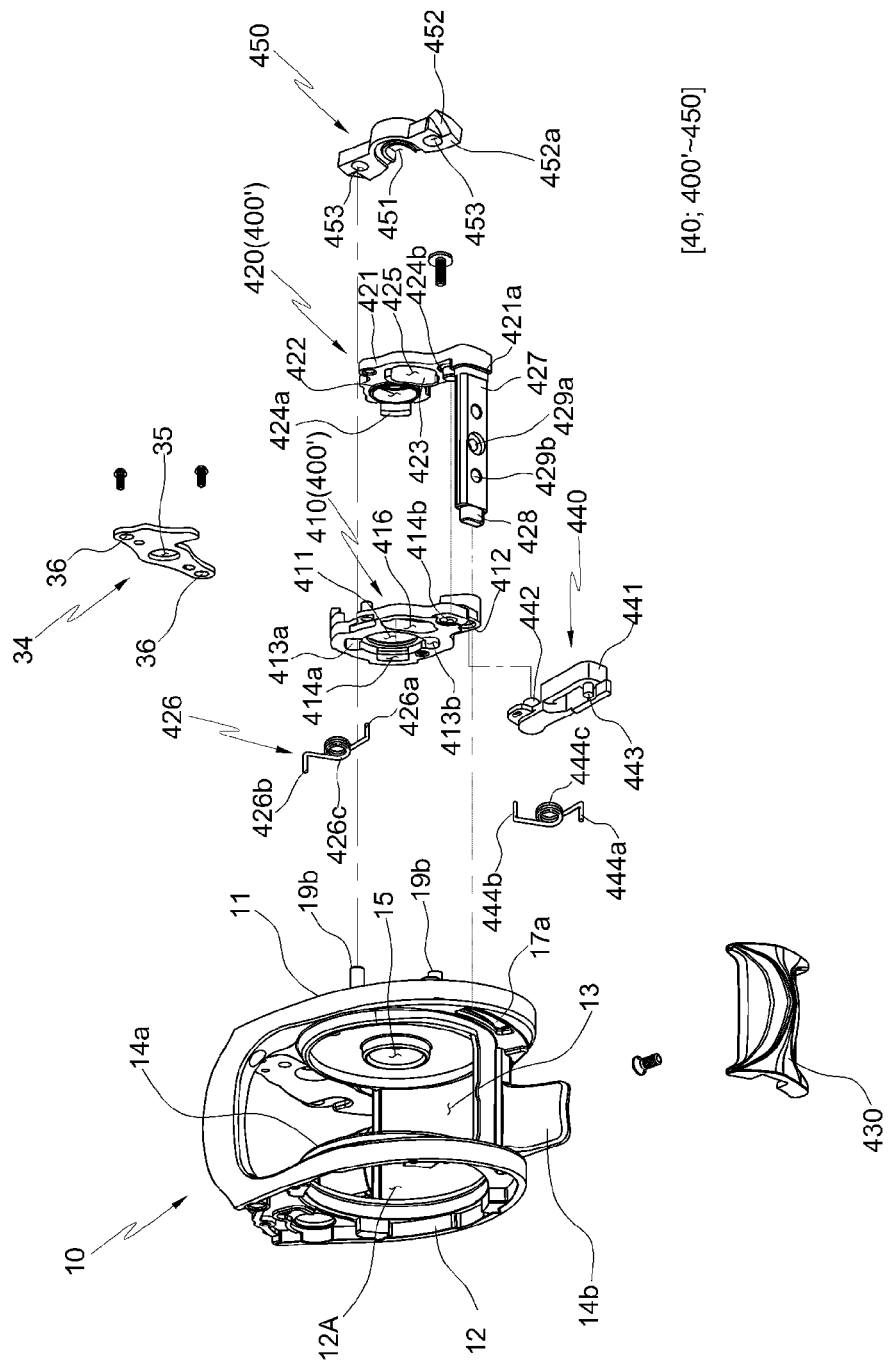
FIGS. 8 through 10 are exploded perspective views showing, in different directions, a second embodiment of the fishing reel according to the present invention.
Figure 9:
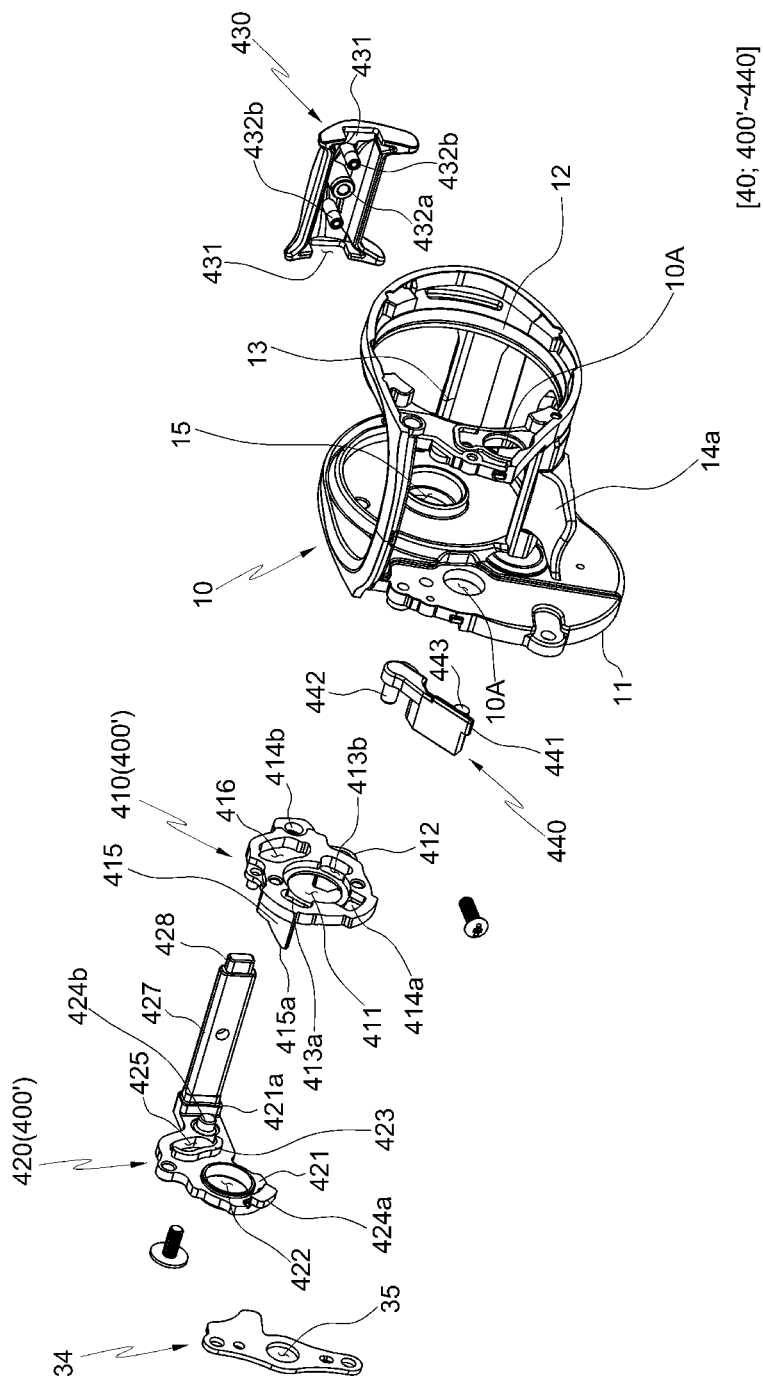
Figure 10:
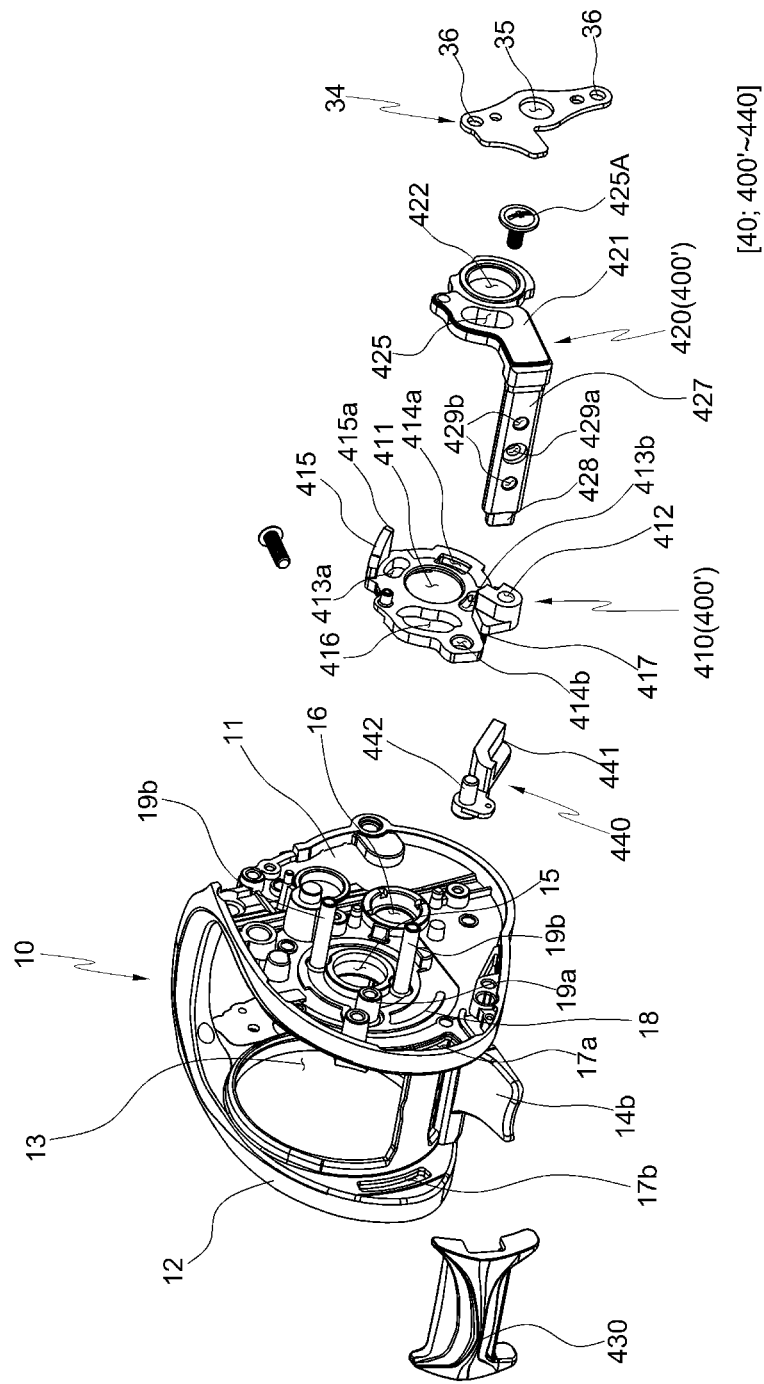
Figure 11A:
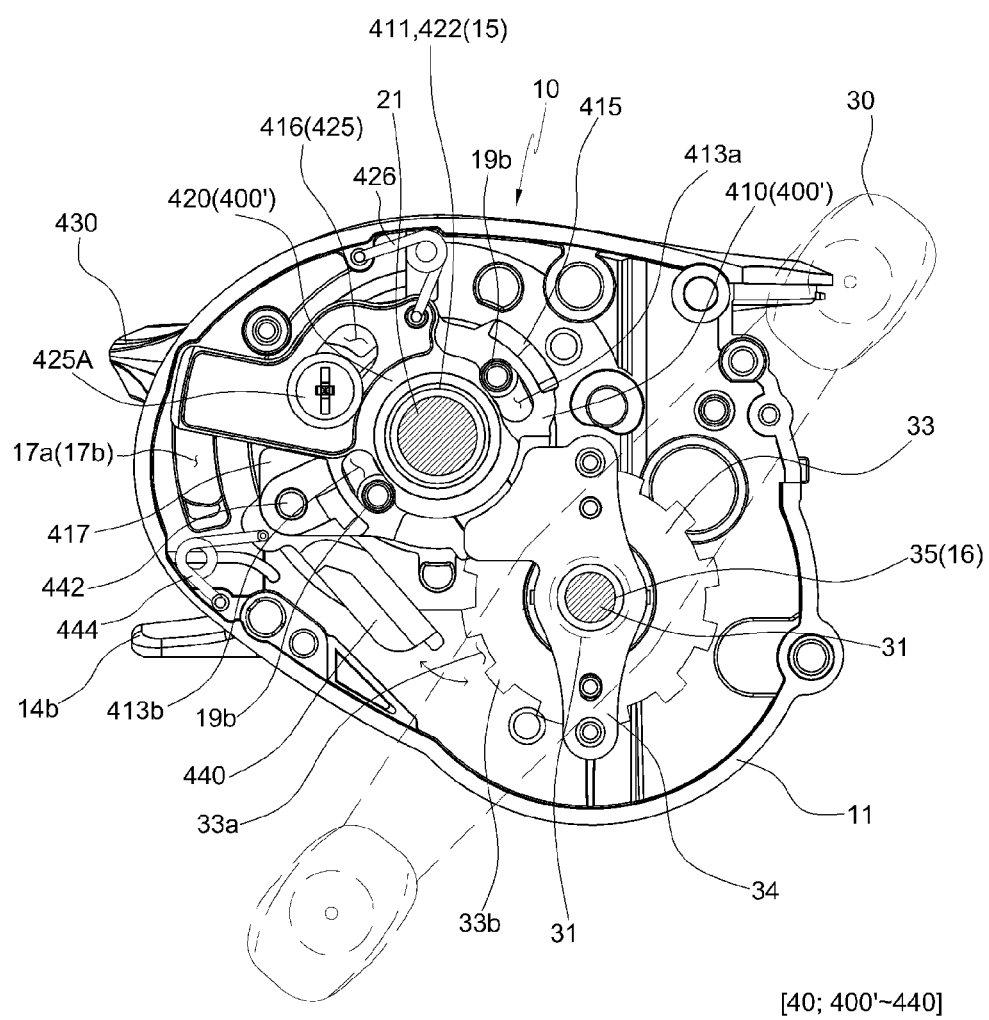
FIG. 11A is a side view showing the internal construction of the second embodiment of the fishing reel according to the present invention.
Figure 11B:
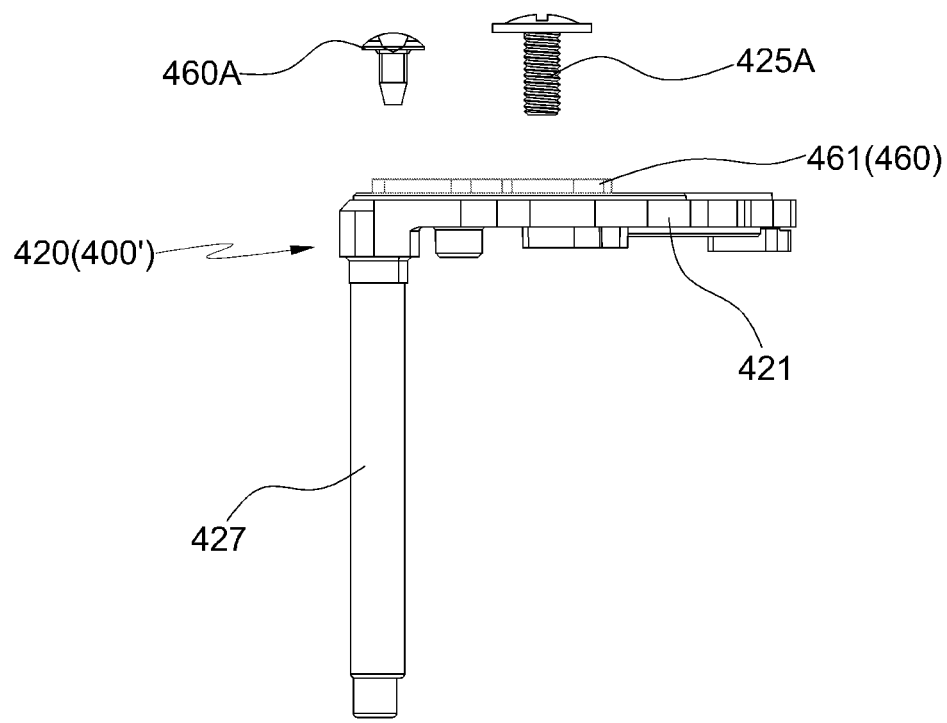
FIG. 11B is a plan views showing a reinforcing member of the second embodiment of the fishing reel according to the present invention.
Figure 12A:
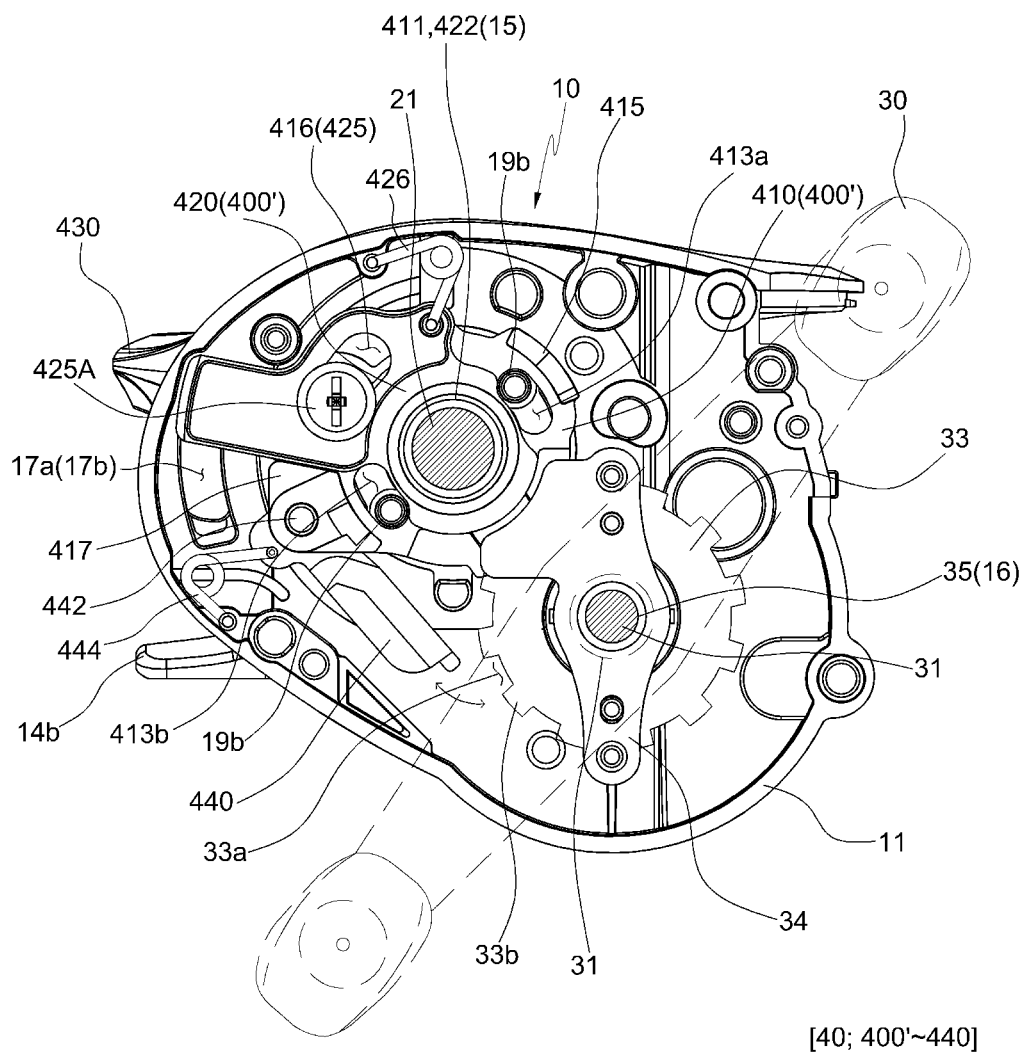
FIG. 12A is a side view showing the internal construction of the second embodiment of the fishing reel according to the present invention.
Figure 12B:
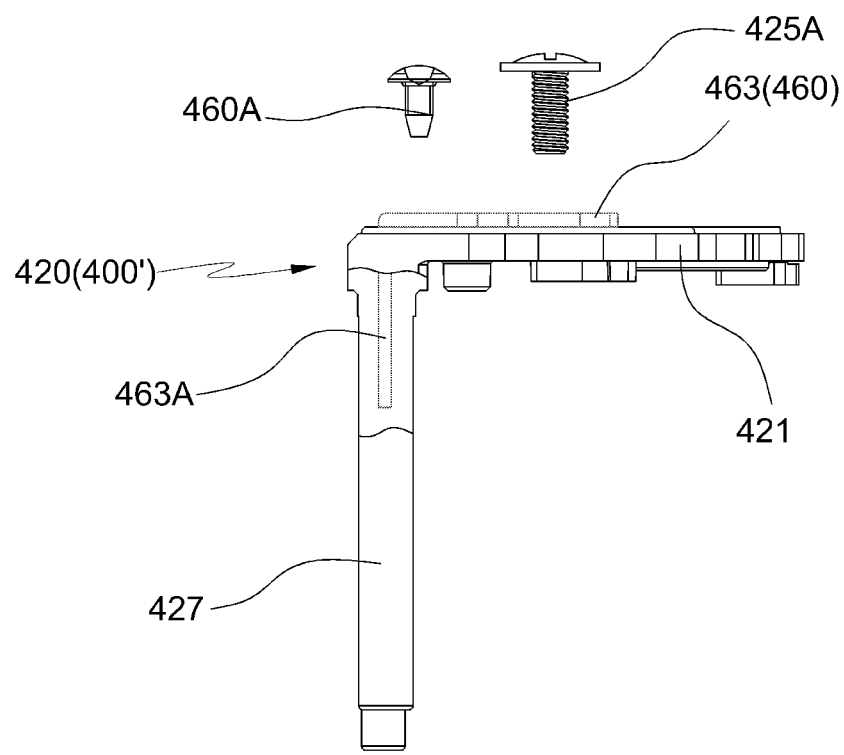
FIG. 12B is a plan view showing a reinforcing member of the second embodiment of the fishing reel according to the present invention.
Figure 13A:
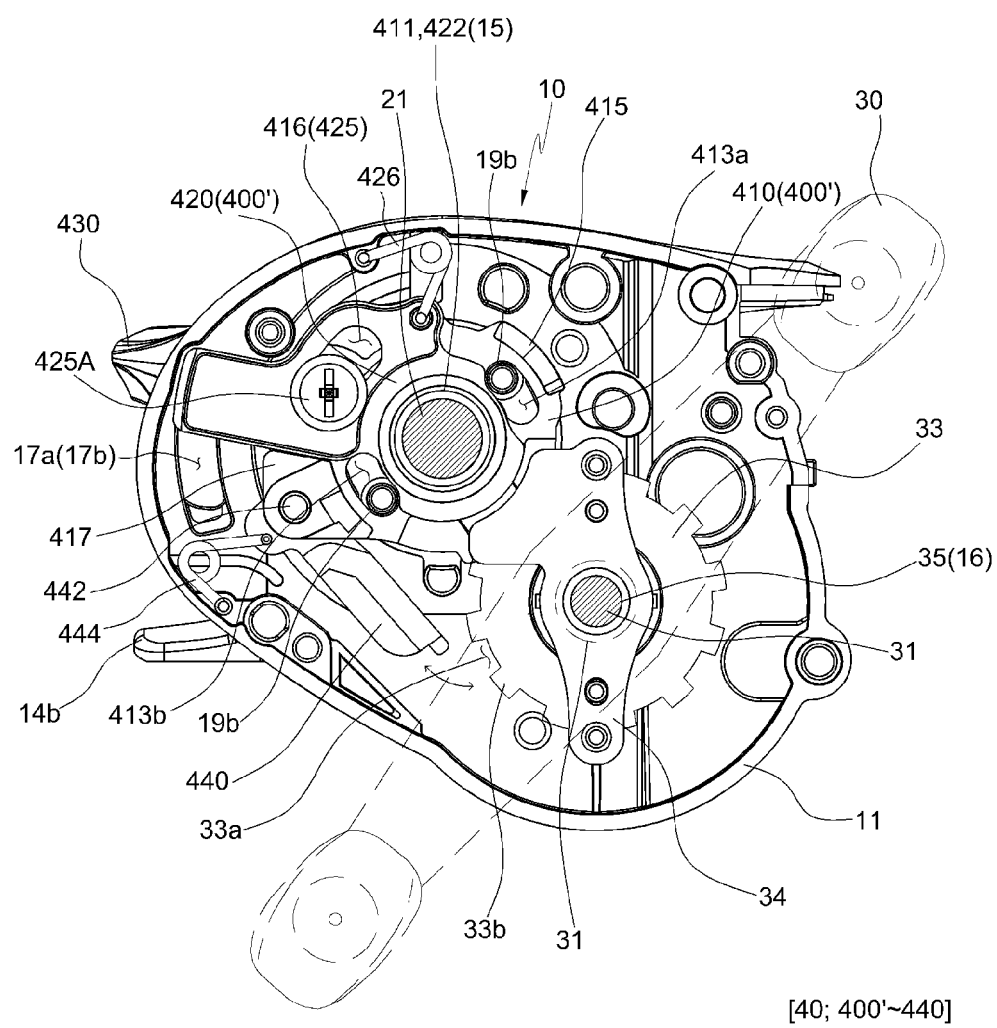
FIG. 13A is a side view showing the internal construction of the second embodiment of the fishing reel according to the present invention.
Figure 13B:
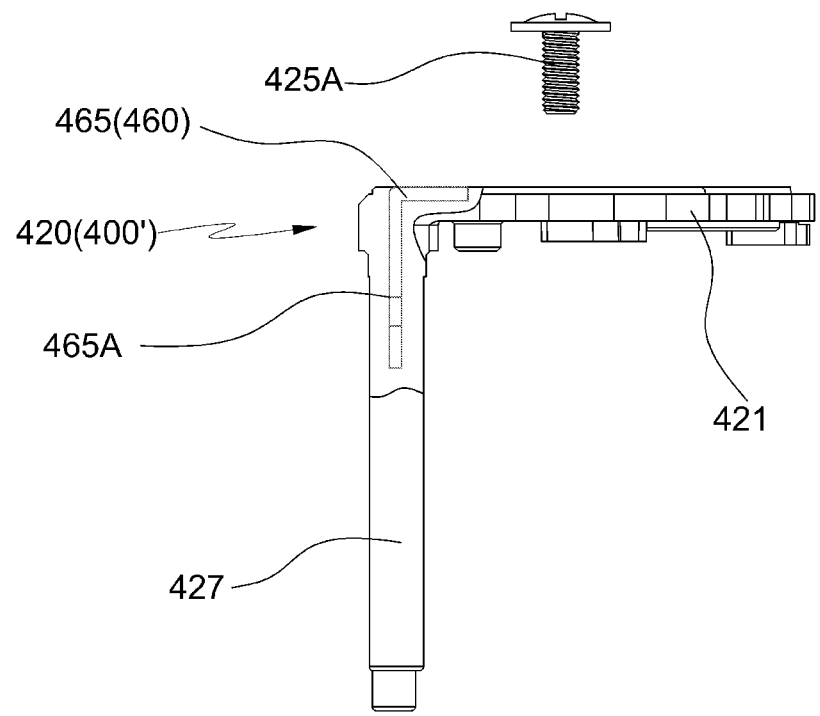
FIG. 13B is a plan view showing a reinforcing member of the second embodiment of the fishing reel according to the present invention.

Meanwhile, as shown in FIGS. 3A, 5A and 7A, the clutch cam 400A is connected to the first coupling part 11 of the frame 10 by a first elastic member 426 so that when the clutch bar 430 that has been pressed or locked is released, the integrated clutch unit 400 can be returned to its original position by the elastic force of the first elastic member 426 (refer to FIG. 8 to see the detailed structure of the first elastic member 426).

A first end 426a of the first elastic member 426 is rotatably coupled to the clutch cam 400A. A second end 426b of the first elastic member 426 is rotatably coupled to the first coupling part 11.

Holes to which the ends of the first elastic member 426 are rotatably coupled are respectively formed in the clutch cam 400A and the first coupling part 11.

The first elastic member 426 is a torsion spring having a coiled part 426c in a medial portion thereof. The first elastic member 426 is configured such that the opposite ends thereof exert the elastic force in the direction in which the coil part rotates (in detail, in the direction in which the opposite ends move away from each other).

When the integrated clutch unit 400 rotates, the opposite ends of the first elastic member 426 move toward each other while the first elastic member 426 rotates on the opposite ends thereof. When pressure that has rotated the integrated clutch unit 400 is removed, the opposite ends of the first elastic member 426 that have been close to each other are moved away from each other by the elastic force of the first elastic member 426, thus assisting the operation of returning the clutch cam 400A (that is, the integrated clutch unit 400) to its original position.

The detailed construction and function of the first elastic member 626 can also be applied to the separable clutch unit 400', which will be explained later herein.

Preferably, the clutch cam 400A is manufactured by injection molding and is made of synthetic resin such as plastic acetal having lubricative properties because the clutch cam 400A must be brought into contact with and supported by the first coupling part 11 of the frame 10 while rotating on the first coupling part 11.

In the present invention, when the user pushes the clutch bar 430, the clutch 40 is operated. Then, pressure is transmitted to the clutch cam 400A via the clutch link 407, thus rotating the integrated clutch unit 400. Thereby, the position of the ratchet pawl 440 rotatably coupled to the clutch cam 400A is changed so that an end 441 of the ratchet pawl 440 is locked to one of the ratchet depressions 33a. Consequently, the clutch 40 enters the clutch-OFF state.

For this, as shown in FIGS. 2 through 7A (refer to FIG. 8 to see the construction not shown in FIG. 2 or 3A), the ratchet pawl 440 is rotatably coupled to the clutch cam 440A by a hinge shaft 442.

In detail, the hinge shaft 442 protrudes from a first end of the ratchet pawl 440. A hinge hole 402 in which the hinge shaft 442 is rotatably disposed is formed in the clutch cam 400A at a predetermined position around the first through hole 401.

Furthermore, a guide protrusion (443; refer to FIG. 8) is provided on an inner surface of the ratchet pawl 440. A guide piece 18 is provided on the first coupling part 11 of the frame 10 so that the guide protrusion 443 comes into contact with the guide piece 18 to guide the end of the ratchet pawl 440 toward the ratchet 33 of the rotating shaft 31.

When the integrated clutch unit 400 is rotated by the user, the ratchet pawl 440 is rotated downward around the hinge shaft 442 while the guide protrusion 443 makes contact with the guide piece 18. Thus, the end 441 of the ratchet pawl 440 is inserted into one of the ratchet depression 33a of the rotating shaft 31, whereby the clutch 40 enters the clutch-OFF state.

Therefore, when the clutch 40 is in the clutch-OFF state, the end 441 of the ratchet pawl 440 makes contact with a corresponding ratchet protrusion 33b of the ratchet 33 and thus restricts the rotation of the ratchet 33. Thereby, the rotating shaft 31 (or the handle 30) cannot be rotated in the direction in which the fishing line is reeled out, that is, in the clockwise direction of the drawings.

In this state, when the rotating shaft 31 (or the handle 30) is rotated in the direction in which the fishing line is reeled in, that is, in the counterclockwise direction of the drawings, each of the other ratchet protrusions 33b that are not locked to the ratchet pawl 440 rotates and pushes the ratchet pawl 440 upward (at this time, the ratchet pawl 440 is rotated around the hinge shaft 442). Given this, the user turns the clutch 40 ON or OFF depending on conditions during use of the fishing reel and thus is able to appropriately control the spool 20.

While the rotating shaft 31 is rotated in the counterclockwise direction, the end 441 of the ratchet pawl 440 that has been pushed upward by the ratchet protrusion 33b must be returned downward and inserted into the subsequent ratchet depression 33a so that when the user releases the handle 30, the clutch 40 can be maintained in the clutch-OFF state.

To achieve the above purpose, as shown in FIGS. 3A, 5A and 7A, a second elastic member 444 is provided connecting the hinge shaft 442 of the ratchet pawl 440 to the first coupling part 11 of the frame 10 (refer to FIG. 8 to see the detailed structure of the second elastic member).

The second elastic member 444 is made of a torsion spring in the same manner as that of the first elastic member 426. In detail, the second elastic member 444 includes: a first end 444a rotatably coupled to the ratchet pawl 440; a second end 444b rotatably coupled to the first coupling part 11; and a coiled part 444c provided in a medial portion of the second elastic member 444 so as to exert the elastic force in the direction in which the opposite ends 444a and 444b move away from each other.

Therefore, when the clutch 40 is in the clutch-OFF state, the second elastic member 444 exerts the elastic force in the direction in which the opposite ends 444a and 444b move away from each other. Thus, when the ratchet pawl 440 is pushed by the ratchet protrusion 33b while the user manipulates the handle 30 to rotate the ratchet 33, the opposite ends 444a and 444b of the second elastic member 444 are moved close to each other. When the user stops the manipulation of the handle 30, the opposite ends 444a and 444b of the second elastic member 444 are moved away from each other by the elastic force of the second elastic member 444. Thereby, the end of the ratchet pawl 440 is returned into the corresponding ratchet depression 33a so that the clutch 40 can be maintained in the clutch-OFF state.

Likewise, the function and construction pertaining to the ratchet pawl 440 and the second elastic member 444 can also be applied to the separable clutch unit 400', which will be explained later herein.

As shown in FIGS. 8 through 14B, in a fishing reel according to a second embodiment of the present invention, the clutch 40 includes a clutch cam 410 and a separable clutch unit 400'.

The clutch cam 410 is supported on the outer surface of the first coupling part 11 of the frame 10 and is fitted over the shaft 21 to be rotated along with the shaft 21.

The clutch unit 400' includes a clutch link 420. The clutch link 420 includes: a rotating part 421 that is coupled to the clutch cam 410 and is rotated around the shaft 21 along with the clutch cam 410; and a pressing part 427 that is connected to the rotating part 421 and is coupled to the clutch bar 430 disposed outside the frame 10 so that when the clutch bar 430 is pressed, the pressing part 427 rotates the rotating part 421.

Having a structure similar to that of the clutch cam 400A of the integrated clutch unit 400, the clutch cam 410 of the separable clutch unit 400' has a first through hole 411, a hinge hole 412, a first guide slot 416, first and second guide slots 413a and 413b and second inclined guide surfaces 452 (details related to the second inclined guide surfaces 452 will be explained later herein).

Coupled to the clutch cam 410 of the separable clutch unit 400', the rotating part 421 of the clutch link 420 has: a second through hole 422 corresponding to the first through hole 411; and a second guide slot 425 corresponding to the first guide slot 416.

In the separable clutch unit 400', the pressing part 427 connected to the rotating part 421 of the clutch link 420 has the same structure as that of the clutch link 400A of the integrated clutch unit 400. In detail, a guide protrusion 428 is provided on an end of the pressing part 427. A first bolt coupling hole 429a is formed in a medial portion of the pressing part 427 for use in connecting with the clutch bar 430. Protrusion coupling holes 429b are formed in the pressing part 427 at opposite sides of the first bolt coupling hole 429a.

For the separable clutch unit 400', the construction pertaining to overlap between the first and second through holes 411 and 422 and between the first and second guide slots 416 and 425 and the construction related to first and second guide slots 413a and 143b, the second inclined guide surfaces 452 and the hinge hole 412 have the same structure and function as those of the corresponding construction of the integrated clutch unit 400; therefore, further explanation will be omitted.

For use in coupling the clutch cam 410 to the rotating part 421, a first coupling hole 414a and a second coupling hole 414b are formed in the clutch cam 410 around the first through hole 411. Furthermore, a first coupling protrusion 424a and a second coupling protrusion 424b that are respectively coupled to the first and second coupling holes 414a and 414b are provided on an inner surface of the rotating part 421 around the second through hole 422.

In order to couple the clutch cam 410 to the rotating part 421 and ensure the reliability in the operation of rotating the separable clutch unit 400' along with the rotating part 421, a coupling piece 423 corresponding to a portion of an inner surface of the first guide slot 416 protrudes from an inner circumferential surface of the second guide slot 425. The coupling piece 423 is inserted into the first guide slot 416. Here, the coupling piece 423 is configured such that it does not interfere with the first guide protrusion 19a that is inserted into the first and second guide slots 416 and 425.

The clutch cam 410 includes a contact part 417 provided at a position adjacent to the second guide slot 413b. A lower surface of a junction between the rotating part 421 and the pressing part 427 is coupled to the clutch link 420 while making contact with the contact part 417.

When the force of pressing the pressing part 427 (that is, the force of rotating the rotating part 421) is transmitted to the clutch cam 410, the separable clutch unit 400' is rotated along with the rotating part 421 in the counterclockwise direction of the drawings.

The other construction of the clutch using the separable clutch unit 400' is the same as that of the clutch using the integrated clutch unit 400; therefore, further explanation is deemed unnecessary.

Meanwhile, if the user can manipulate the handle 30 only while pushing the clutch bar 430, it will be very inconvenient. Given the fact that when a fish bites the user must momentarily snatch the fishing rod and repeatedly rotate the handle 30 to reel in the fishing line or reel out the fishing line while the clutch 40 is in the clutch-ON state, the usefulness of the fishing rod in which the clutch 40 is always maintained in the clutch-OFF state by continuously pressing the clutch bar 430 is reduced.

To avoid the above-mentioned disadvantage, the clutch 40 according to the present invention further includes a yoke 450 that is fitted over the shaft 21 so as to control the operation of the clutch 40.

Figure 14A:
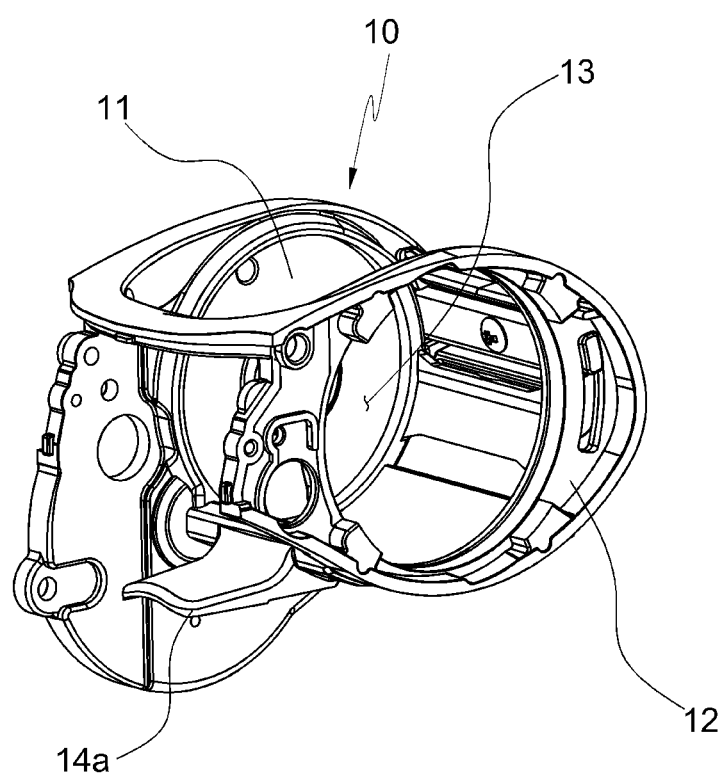
FIGS. 14A and 14B are perspective views showing, in different directions, the internal construction of the fishing reel according to the present invention.
Figure 14B:
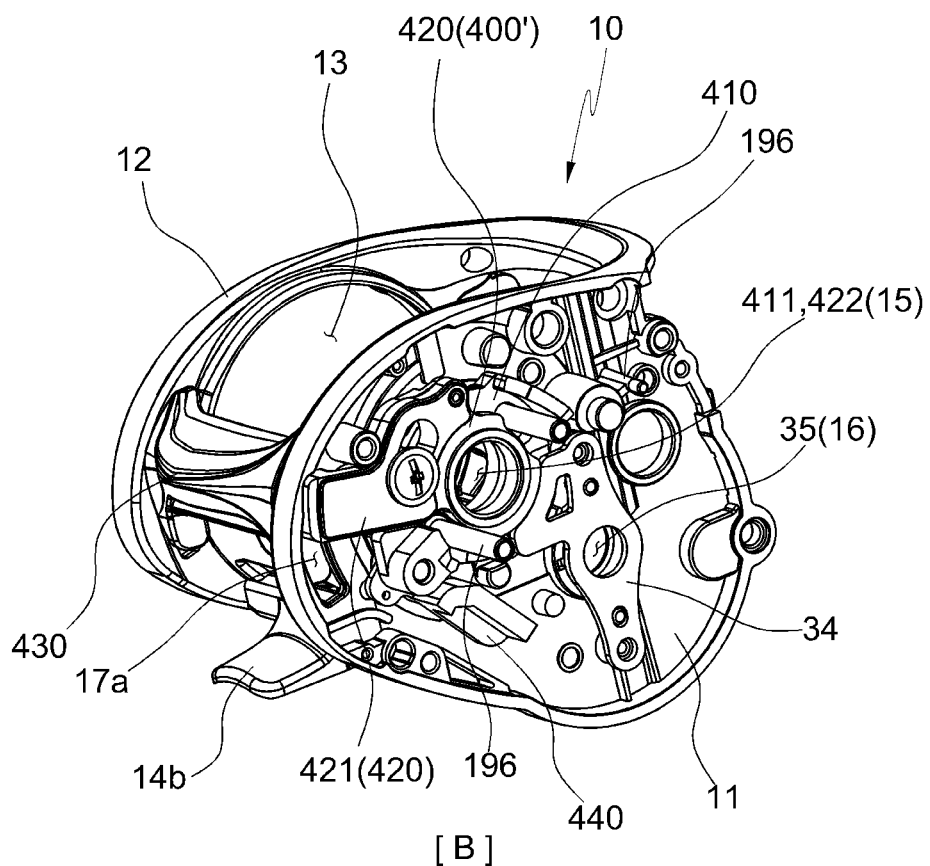

Hereinafter, explanation for the yoke 450 of the separable clutch unit 400' with reference to FIGS. 14A and 14B represents explanation of the yoke according to the present invention. The construction of the yoke 450 can also be applied to the integrated clutch unit 400 in the same manner.

As shown in FIG. 8, the clutch 40 according to the present invention further includes the yoke 450 that is fitted over the shaft 21. The yoke 450 is moved along the shaft 21 by the rotation of the separable clutch unit 400', thus controlling conditions in the operation of the clutch 40.

The yoke 450 has in a central portion thereof a third through hole 451 in which the rotating shaft 31 (in detail, a gear coupled to an end of the rotating shaft 31) of the spool 20 is installed. The second inclined guide surfaces 452, each of which is inclined inward in the direction of rotation of the rotating part 421, are concavely and respectively formed in the inner surfaces of the opposite ends of the yoke 450. A stop hole 453 is formed in the yoke 450 inside each second inclined guide surface 452. The second guide protrusions 19b of the first coupling part 11 are inserted into the respective stop holes 453.

Furthermore, first inclined guide surfaces 415 protrude from the clutch cam 410 outside the respective first and second guide slots 413a and 413b. Each first inclined guide surface 415 is inclined outward in the direction opposite the direction of the rotation of the rotating part 421 and comes into contact with the corresponding second inclined guide surface 452.

When the separable clutch unit (400'; the combination of the clutch cam 410 and the clutch link 420) rotates, the first inclined guide surfaces 415 rotate along with the separable clutch unit 400'. Because the yoke 450 is restricted in rotation by the second guide protrusions 19b, the second inclined guide surfaces 452 are pushed outward along the first inclined guide surfaces 415. Thereby, the yoke 450 is moved along the shaft 21 and thus changed in position relative to the shaft 21.

When the rotation of the separable clutch unit 400' is completed (that is, the clutch-OFF operation of the clutch 40 is completed), non-inclined parts 452a that are formed on inner ends of the respective second inclined guide surfaces 452 of the yoke 450 are respectively supported on support protrusions 415a that are provided on outer ends of the respective first inclined guide surfaces 415 of the clutch cam 410. In this way, the clutch-ON or -OFF operation of the clutch by the clutch bar can be conducted in a one-touch manner.

That is, while the non-inclined parts 452a are supported on the respective support protrusions 415a, the yoke 450 that has been changed in position can be fixed in place without returning to its original position. Therefore, the return rotation of the separable clutch unit 400' that is biased to return its original position by the elastic force of the first elastic member 426 is restricted. Thus, the clutch-OFF state of the clutch 40 can be continuously maintained.

Preferably, the yoke 450 is manufactured by injection molding and is made of synthetic resin such as plastic acetal having lubricative properties because it is operated making contact with the first inclined guide surfaces 415 of the clutch cam 410.

A coil spring (not shown) is provided on each second guide protrusion 19b so that the yoke 450 is elastically biased inward with respect to the side-surface cover C1.

Therefore, when the locking means L is released, the yoke 450 is returned its original position by the elastic force of the coil springs. In other words, the yoke 450 is moved inward along the shaft 21, whereby the combination of the clutch cam 410 and the clutch link 420 that has been restricted by the second inclined guide surface 452 is released. Then, the combination is returned to its original position by the elastic force of the first elastic member 426. The clutch 40 thus enters the clutch-ON state.

In FIGS. 2 and 3A, reference numerals 405 and 405a respectively denote a first inclined guide surface and a non-inclined part of the integrated clutch unit 400.

As described above, the hybrid clutch 40 of the present invention can reduce the entire weight of the fishing reel R and facilitate the process of manufacturing the fishing reel R. Therefore, the present invention makes it possible to manufacture a fishing reel meeting the recent trend d of smaller-size the fishing reels that are lighter, shorter in length, and which use thinner materials.

For example, if the clutch of the fishing reel is made of stainless steel through a press process or made of zinc through a casting process, the fishing reel made of such material is naturally heavier than the fishing reel made of synthetic resin such as plastic acetal and thus does not meet the trend aiming toward smaller-size fishing reels that are lighter, shorter in length, and which use thinner materials.

Nevertheless, in the fishing reel according to the conventional technique, the clutch was necessarily made of stainless steel or zinc to prevent the clutch from being broken because pressures derived from the operation of the clutch are concentrated on the contact parts or junctions of the several elements.

However, in the present invention, the clutch is configured such that the clutch bar 430 is supported in the first and second guide slots 17a and 17b of the first and second coupling parts 11 and 12 of the frame 10 and the integrated clutch unit 400 or the separable clutch unit 400' has a three-dimensional coupling structure. Therefore, when the clutch is operated, force is evenly distributed while pressure is transmitted between the elements of the clutch. Thus, synthetic resin such as plastic acetal having lubricative properties can be used as material for the clutch, thus making it possible to reduce the weight of the fishing reel as well as to reinforce the stiffness of the fishing reel.

Furthermore, the clutch can be manufactured by an injection molding method because synthetic resin is used. Therefore, it is easy to manufacture the integrated or separable clutch unit. In addition, such a manufacturing method makes it easy to form separate reinforcing stiffeners and ribs on a portion of the clutch on which pressure is concentrated. The hybrid clutch can be manufactured meeting the recent trend aiming toward smaller-size fishing reels that are lighter, shorter in length, and which use thinner materials.

Meanwhile, as shown in FIGS. 2 through 14B, the present invention further includes a bearing plate 34 that is fitted over the rotating shaft 31 and is brought into contact with the ratchet 33.

The bearing plate 34 has: in a central portion thereof a first passing hole 35 in which the rotating shaft 31 is disposed; and first bolt coupling holes 36 formed in respective opposite ends of the bearing plate 34. Bolt coupling protrusions corresponding to the first bolt coupling holes are provided on the first coupling part 11 of the frame 11. The bolt coupling protrusions are inserted into the respective first bolt coupling holes, and then bolts are tightened into the bolt coupling protrusions so as to fasten the bearing plate to the frame.

Although the embodiments of the fishing reel having the hybrid clutch according to the present invention have been disclosed for illustrative purposes, those skilled in the art will appreciate that various modifications, additions and substitutions are possible, without departing from the scope and spirit of the invention as disclosed in the accompanying claims.

What is claimed is:

1. A fishing reel having a clutch, comprising:
   a frame;
   a spool rotatably installed in the frame by a shaft, with a fishing line wound around an outer circumferential surface of the spool;
   a handle having a rotating shaft, the handle being rotated in conjunction with the shaft of the spool; and
   a clutch selectively coming into contact with a ratchet provided on the rotating shaft of the handle and controlling rotation of the spool, the clutch including:
      an integrated plastic clutch unit comprising a clutch cam supported on a surface of the frame and fitted over the shaft to be rotated, and a clutch link connected to the clutch cam and coupled to a clutch bar disposed outside the frame so that when the clutch bar is pressed the clutch link rotates the clutch cam; and
      a ratchet pawl coupled to the clutch cam by a hinge, the ratchet pawl selectively coming into contact with the ratchet depending on rotation of the clutch cam and controlling the rotation of the spool,
   wherein the frame has a receiving space communicating with a front opening, and the spool is installed in the receiving space by the shaft, with a first coupling part and a second coupling part being provided on left and right side surfaces of the frame,
   the clutch link is connected to a portion of a perimeter of the clutch cam, and is disposed both in a first guide slot formed in a rear portion of the first coupling part and in a second guide slot formed in a rear portion of the second coupling part,
   a guide protrusion is provided on an end of the clutch link and is disposed in the second guide slot such that opposite ends of the clutch link are slidably disposed in and supported by the first guide slot and the second guide slot,
   the clutch cam has therein a first guide slot so that the integrated plastic clutch unit is rotatably supported by the first coupling part of the frame, and
   the integrated plastic clutch unit further includes a reinforcing member coupled to a junction between the clutch cam and the clutch link or a junction between the clutch link and the clutch bar, wherein the reinforcing member includes a reinforcing plate that covers an outer surface of the clutch cam and is coupled to the clutch cam by a bolt, and wherein the reinforcing plate is a planar member covering both a junction between the clutch link and the clutch cam and a portion of the outer surface of the clutch cam, and further has a coupling hole for bolt coupling, and an auxiliary guide slot corresponding to the first guide slot for use in guiding rotation of the integrated plastic clutch unit.

2. A fishing reel having a clutch, comprising:

a frame;

a spool rotatably installed in the frame by a shaft, with a fishing line wound around an outer circumferential surface of the spool;

a handle having a rotating shaft, the handle being rotated in conjunction with the shaft of the spool; and a clutch selectively coming into contact with a ratchet provided on the rotating shaft of the handle and controlling rotation of the spool, the clutch including:

an integrated plastic clutch unit comprising a clutch cam supported on a surface of the frame and fitted over the shaft to be rotated, and a clutch link connected to the clutch cam and coupled to a clutch bar disposed outside the frame so that when the clutch bar is pressed the clutch link rotates the clutch cam; and a ratchet pawl coupled to the clutch cam by a hinge, the ratchet pawl selectively coming into contact with the ratchet depending on rotation of the clutch cam and controlling the rotation of the spool, wherein the frame has a receiving space communicating with a front opening, and the spool is installed in the receiving space by the shaft, with a first coupling part and a second coupling part being provided on left and right side surfaces of the frame, the clutch link is connected to a portion of a perimeter of the clutch cam, and is disposed both in a first guide slot formed in a rear portion of the first coupling part and in a second guide slot formed in a rear portion of the second coupling part, a guide protrusion is provided on an end of the clutch link and is disposed in the second guide slot such that opposite ends of the clutch link are slidably disposed in and supported by the first guide slot and the second guide slot, the clutch cam has therein a first guide slot so that the integrated plastic clutch unit is rotatably supported by the first coupling part of the frame, and the integrated plastic clutch unit further includes a reinforcing member coupled to a junction between the clutch cam and the clutch link or a junction between the clutch link and the clutch bar, wherein the reinforcing member includes: a reinforcing plate that covers an outer surface of the clutch cam and is coupled to the clutch cam by a bolt; and a bent part that is bent from a portion of the reinforcing plate and is inserted into the clutch link, and wherein the reinforcing plate further has an auxiliary guide slot corresponding to the first guide slot for use in guiding rotation of the integrated plastic clutch unit.

* * * * *